(12) United States Patent
Hinkle et al.

(10) Patent No.: US 6,473,604 B1
(45) Date of Patent: Oct. 29, 2002

(54) AUDIO LEVEL MATCHING OF DIFFERENT RADIO INPUT SOURCES

(75) Inventors: Joseph A. Hinkle, Huntsville; Stephen K. Gilbert, Harvest; Thomas W. Franks, Madison, all of AL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/438,723

(22) Filed: Nov. 11, 1999

(51) Int. Cl.$^7$ .................................................. H04B 1/06
(52) U.S. Cl. ................................ 455/232.1; 455/233.1; 455/186.1
(58) Field of Search ............................. 455/232.1, 234.1, 455/234.2, 251.1, 227, 193.1, 129, 130, 142, 344, 345, 186.1, 233.1, 219, 161.1

(56) References Cited

U.S. PATENT DOCUMENTS

| | | | |
|---|---|---|---|
| 5,432,854 A | | 7/1995 | Honjo et al. |
| 5,793,805 A | | 8/1998 | Nikides |
| 5,883,963 A | * | 3/1999 | Tonella ........................ 381/102 |
| 5,964,821 A | * | 10/1999 | Brunts et al. ................ 340/990 |
| 6,064,868 A | * | 5/2000 | Kobayashi ................ 455/193.1 |
| 6,148,008 A | * | 11/2000 | Okamoto ..................... 370/486 |
| 6,344,801 B1 | * | 2/2002 | Aoki et al. ................. 307/10.1 |
| 6,345,179 B1 | * | 2/2002 | Wiegers et al. ............. 455/344 |

* cited by examiner

Primary Examiner—William Trost
Assistant Examiner—Congvan Tran
(74) Attorney, Agent, or Firm—Mark P. Calcaterra

(57) ABSTRACT

A method and radio receiver provide matching of output levels for a plurality of receiver input sources. The method includes the step of creating alignment information for the plurality of input sources. The method further provides for storing the alignment information in a computer readable memory, and converting a required output level into a matched output level. The matched output level is based on the alignment information contained in the computer readable memory corresponding to the selected input source, and the required output level is obtained from a volume control setting. Thus, creation, storage, and retrieval of alignment information allows for real-time matching of output levels for multiple input sources.

14 Claims, 2 Drawing Sheets

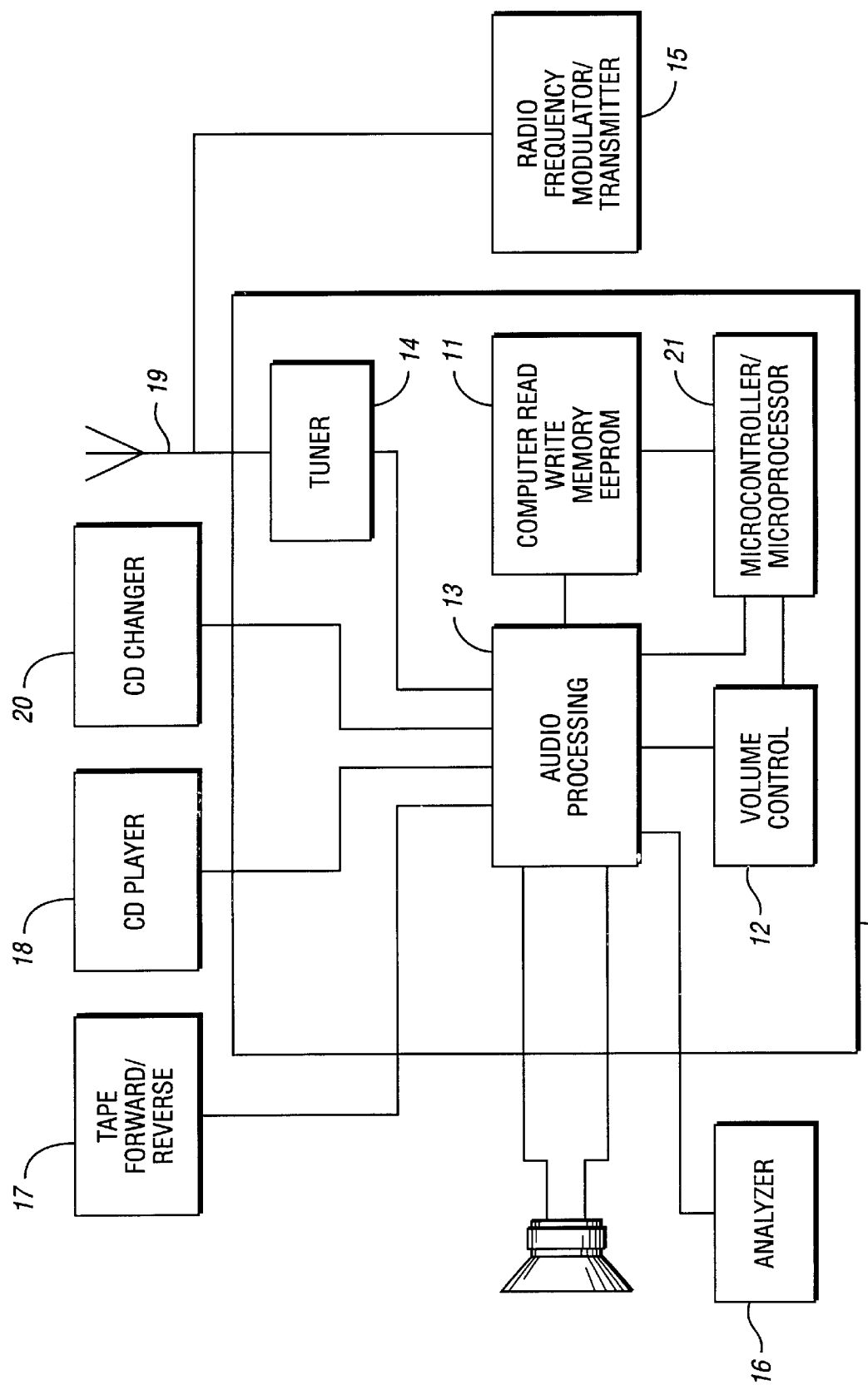

AUDIO LEVEL MATCHING OF DIFFERENT RADIO INPUT SOURCES

BACKGROUND OF THE INVENTION

1. Field of the Invention

The present invention relates generally to automotive audio systems. More particularly, the present invention relates to a method and receiver capable of automatically matching output levels of different radio receiver input sources.

2. Discussion of the Related Art

In the automotive industry, the development of audio systems has generally depended upon the format of commercially available recordings and the feasibility of modifying standard audio systems for automotive use. A typical automotive audio system controls a stereo signal which is obtained from various different input sources such as an AM/FM antenna and tuners, a cassette tape player, or a compact disc player. A common problem with these different input sources relates to the electrical characteristics unique to each source. Differences in these characteristics substantially affect receiver signal processing and create an audio level matching problem currently inadequately addressed by present approaches to automotive audio systems. For example, a typical tape player will employ resistance divider networks in its audio path as part of internal signal processing and voltage division. These resistor divider networks either use fixed value components or require the manual adjustment of adjustable components. The values of the components are selected or are manually adjusted during the manufacturing process in an attempt to provide a known audio level at the output of the tape player. Each resistor in the network has a tolerance which can contribute to an overall tolerance stack within a given divider network. This creates a voltage attenuation that will be dependent upon a nearly infinite number of possible resistor combinations or on the accuracy and attentiveness of the technician making the manual adjustment. Thus, each tape player will have a unique audio output signal level which can only be approximated through statistical techniques and individual testing of every unit. This lack of predictability can result in a significant difference in the receiver's audio output level when playing a cassette tape as opposed to listening to an FM radio signal, for example.

Present standards typically require a maximum of 3 dB difference in receiver audio output between any two input sources. In other words, an example standard would be given a 1 watt reference audio volume level, a specified AM input and a specified FM input must produce a receiver audio output level within 3 dB of one another. This receiver audio output tolerance must be held even though the individual AM and FM tuners might have been made by different manufacturers and may have different output levels relative to each other. Industry standard cassette tapes and CD's are available for testing and design of tape and CD players with respect to these standards. Similarly, specifications are commonly known to describe modulation and Radio Frequency (RF) input settings for AM and FM signals. While all of these matching requirements are well documented and used within the industry, producing a radio receiver which will exhibit audio output levels which are relatively constant with the application of different input sources has proven to be difficult, if not impossible, under certain circumstances.

For example, another difficulty associated with the tape player issue is the inability to control voltage attenuation of the audio signal in reverse play mode and forward play mode separately. Since both modes share the same divider networks, the control for matching is typically shared as well. Producing receivers which use tape players as an audio input source and which will have the same audio output levels in both the forward and reverse tape modes is impossible if the same set of divider networks is used in both modes. In addition to the difficulty in meeting the 3 dB matching standard, the standard does not sufficiently address all types of sounds and music. It is therefore desirable to provide a system and method capable of automatically matching all types of radio receiver input sources with respect to output level. It is also desirable to match the audio output of the receiver with different types of audio input to tolerances of less than 3dB, but the present methods make this tightening of the matching standard unachievable on a consistent basis.

SUMMARY OF THE INVENTION

The present invention provides a computerized method for processing a radio receiver input signal generated from a selected input source. Processing results in the matching of output levels for a plurality of input sources. The method includes the step of creating alignment information for the plurality of input sources. The method further provides for storing the alignment information in a computer readable memory, and converting a required output level into a matched output level. The matched output level is based on the alignment information contained in the computer readable memory corresponding to the selected input source, and the required output level is obtained from a volume control setting.

The present invention also provides a method for aligning a radio receiver input source including the step of inputting a reference input signal from the input source to the radio receiver. The method further includes the step of setting a reference volume level on the radio receiver, wherein the reference volume level and the reference input signal determine a reference output level for the input source. The reference output level is then converted into an input source offset for the input source.

Additionally, the invention includes a radio receiver having a computer readable memory containing alignment information relating to a plurality of input sources. A volume control mechanism establishes a volume control setting for both the alignment and processing steps, and an audio processing system receives an input signal from a selected input source. The audio processing system further determines a required output level from the volume control setting, and converts the required output level into a matched output level based on the alignment information.

Further objects, feature and advantages of the invention will become apparent from a consideration of the following description and the appended claims when taken in connection with the accompanying drawings.

BRIEF DESCRIPTION OF THE DRAWINGS

The present invention will become more fully understood from the detailed description and the accompanying drawings, wherein:

FIG. 1 is a block diagram of a radio receiver capable of matching output levels of different input sources in accordance with the present invention;

DETAILED DESCRIPTION OF THE PREFERRED EMBODIMENT

Figure 4:
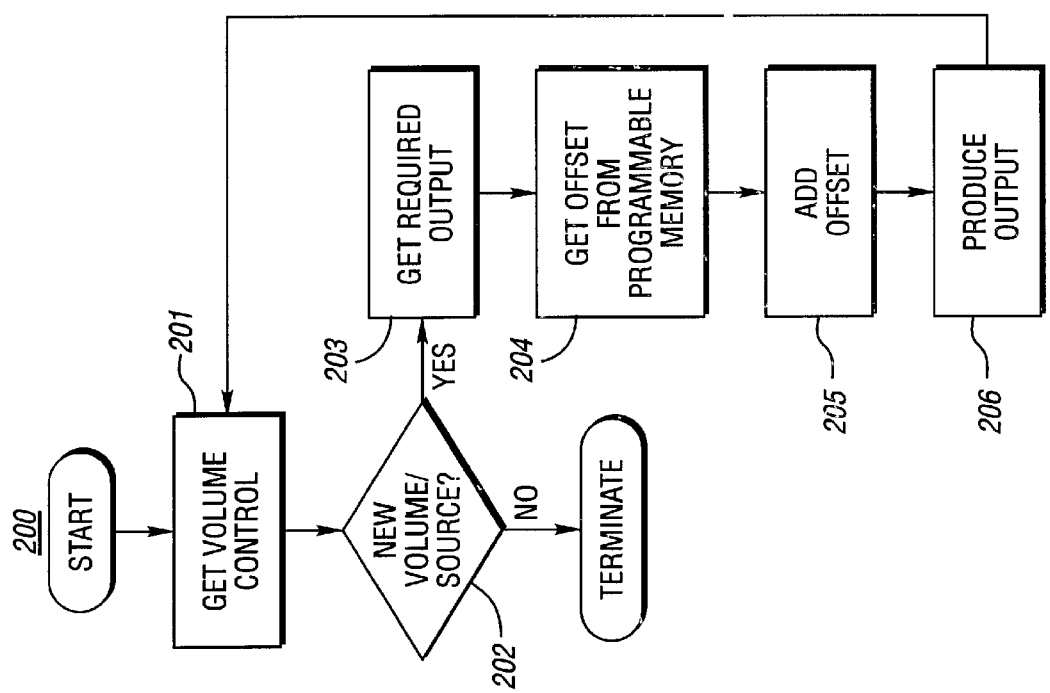
FIG. 4 is a more detailed flow chart of Step 200 in FIG. 2.

FIG. 1 is a block diagram of a radio receiver 10 in accordance with the present invention. The radio receiver 10 has a computer readable memory 11 containing alignment information relating to a plurality of input sources. Input sources include but are not limited to, a tape player 17, a CD player 18, an AM/FM antenna 19 and a CD changer 20. It should be noted that the tape player 17 can be operating in either a forward play or reverse play mode. CD changer 20 can be internal to the receiver housing or external to the receiver housing and can be located either in the passenger compartment of the vehicle or in any other location. A volume control mechanism 12 establishes a volume control setting, and an audio processing system 13 receives an input signal from a selected input source, determines a required output level from the volume control setting, and converts the required output level into a matched output level based on the alignment information. The receiver 10 is therefore capable of matching output levels of different input sources to a high degree of accuracy and in real-time.

Figure 2:
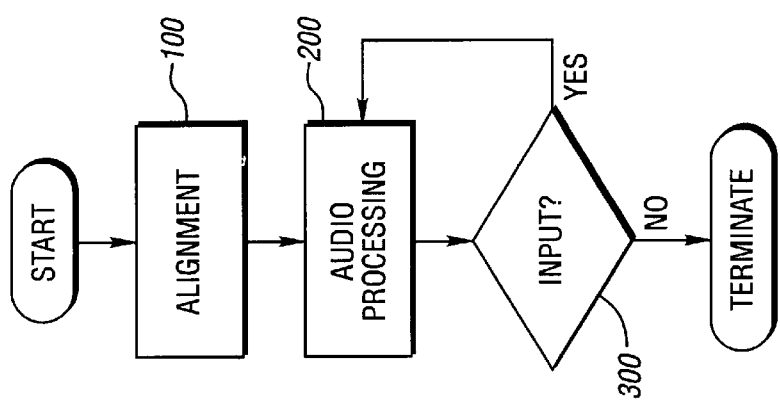
FIG. 2 is a flow chart of a method for processing a radio receiver input signal generated from a selected input source in accordance with the present invention.

Specifically, it will be seen that the alignment information includes an input source offset for each input source, wherein each input source offset is based on a reference output level. It will be further seen that each reference output level is generated with a common reference volume setting. Receiver 10 further comprises a tuner 14 for selecting a desired AM or FM frequency. Viewing FIG. 2 in conjunction with FIG. 1, it will be appreciated that the present invention provides for the creation of alignment information for a plurality of input sources at Step 100, as well as the conversion of a required output level into a matched output level at audio processing Step 200.

Figure 3:
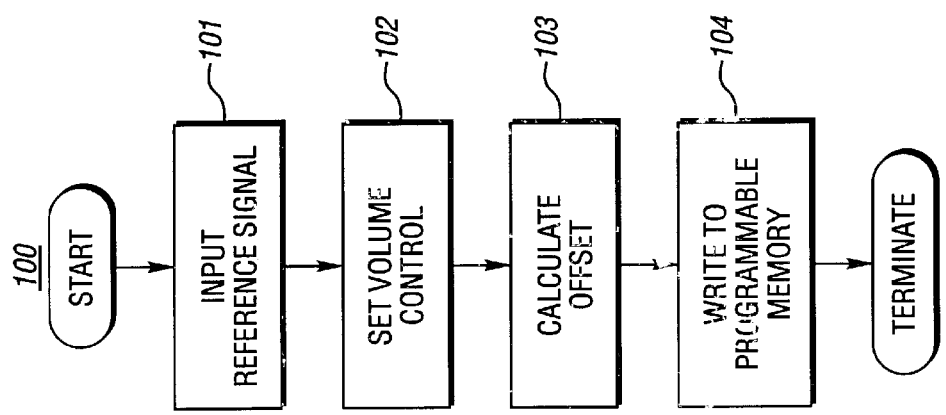
FIG. 3 is a more detailed flow chart of Step 100 in FIG. 2.

Alignment Step 100 will now be described in greater detail. Viewing now FIG. 3 in conjunction with FIG. 1, it will be appreciated that the present invention provides for inputting a reference input signal from each input source to the radio receiver 10 at Step 101. This is done by using either the tape player 17, CD player 18, CD changer 20, or radio transmitter 15 to generate an input signal in accordance with the required specifications. For example, in the case of alignment of the FM signal source, the design/test specification will specify certain gains, modulation levels, etc. to be used as settings for radio transmitter 15. A reference volume level must also be set on the radio receiver 10 at Step 102. A typical volume level for this step would be one watt but any level specified in the design/test specification can be used. The reference volume level and each reference input signal therefore determine a reference output level for each input source.

The invention further provides for the calculation of an input source offset for each input source at Step 103. This calculation is based on each reference output level. For example, the calculation of FM offset is $\text{offset}_{FM}$=standard output level (specified output level due to a standard FM input)—the actual receiver output level due to a standard FM input. Preferably, output levels are measured electronically by analyzer 16 in dB. When the input source is either the tape player 17, the CD player 18, or the CD changer 20, the input source offset will be modified based on a specified adjustment value. This value is specific to the particular source being aligned and is typically generated by the manufacturer. Thus, the calculation for offset will be $\text{offset}_{tape/CD}$=standard output level (specified output level due to a standard CD input)+a source specific adjustment value—the actual receiver output level due to a standard CD input. The method further provides for storing the alignment information in computer readable memory 11 at Step 104. In the preferred embodiment the computer readable memory is an EEPROM, but could be any type of programmable memory such as FLASH memory. Thus, the present invention provides for matching between FM, AM, tape play in forward play mode, tape play in reverse play mode, CD changer, and internal CD input sources. It will be appreciated that the present invention is not limited to these input sources and can be readily expanded to currently known devices as well as devices developed in the future.

Turning now to FIG. 4, Step 200 is described in greater detail. Specifically, Step 201 provides for retrieval of a volume control setting for the purposes of processing a radio receiver input signal generated from a selected input source. If it is determined that the volume and input source have not been changed at Step 202, the present invention provides for an input signal check at Step 300 (see FIG. 2). If the audio processor 13 is still receiving an input signal, audio processing will continue at Step 200. If it is determined that either a new volume or a new source has been selected at Step 202, the required output level is determined at Step 203. The required output level is based on the volume control setting already obtained. At Step 204, a corresponding offset is retrieved from the computer readable memory 11 based on the selected input source. The corresponding offset is then added to the required output level at Step 205 to obtain a matched output level. Step 206 then provides for production of the matched output level.

It is to be understood that the invention is not limited to the exact construction illustrated and described above, but that various changes and modifications may be made without departing from the spirit and scope of the invention as defined in the following claims.

What is claimed is:

1. A method for processing a radio receiver input signal generated from one of a plurality of input sources, the method comprising the steps of:

a) creating alignment information for each of the input sources by
  1) setting a reference volume level on the radio receiver;
  2) inputting a reference input signal from each input source to the radio receiver;
  3) determining a reference output level for each input source; and
  4) calculating an offset for each input source based on the corresponding reference output level;

b) storing the alignment information in a memory;

c) obtaining from a volume control setting, a required output level for the one of a plurality of input sources;

d) retrieving the alignment information for the one input source memory; and e) converting the required output level into a matched output level based on the retrieved alignment information and the required output level.

2. The method of claim 1 wherein the plurality of input sources includes an FM antenna.

3. The method of claim 1 wherein the plurality of input sources includes an AM antenna.

4. The method of claim 1 further comprising the step of modifying the input source offset based on a specified adjustment value.

5. The method of claim 4 wherein the plurality of input sources includes a CD changer.

6. The method of claim 4 wherein the plurality of input sources includes an internal CD player.

7. The method of claim 4 wherein the plurality of input sources includes a tape player operating in a forward play mode.

8. The method of claim 4 wherein the plurality of input sources includes a tape player operating in a reverse play mode.

9. The method of claim 1 wherein the step of storing includes writing the alignment information to an EEPROM contained within the radio receiver.

10. The method of claim 1 wherein the volume control setting is determined from reading a volume taper table.

11. The method of claim 1 wherein the converting step further comprises adding an offset included in the retrieval alignment information to the required output level.

12. Apparatus for automatically matching output levels of different radio receiver input sources, the apparatus comprising:

a volume control mechanism for establishing a volume control setting;

means for determining a reference output level from a reference input signal for each of the input sources;

means for calculating an offset for each of the input sources based on corresponding reference output levels;

means for storing the offsets in a computer programmable memory;

means for obtaining a required output level for one of the input sources as a function of a volume control setting; and means for retrieving the offset for the one input source from the memory and adding the offset to the required output level to generate a matched output level.

13. The apparatus of claim 12 wherein the computer programmable readable memory comprises an EEPROM.

14. The apparatus of claim 12 wherein each reference output level is generated with a common reference volume setting.

* * * * *